United States Patent [19]
Balsells

[11] Patent Number: 4,906,109
[45] Date of Patent: Mar. 6, 1990

[54] SPRING LOADED GUIDE RING

[75] Inventor: Peter J. Balsells, P.O. Box 15092, Santa Ana, Calif. 92705

[73] Assignees: Peter J. Balsells; Joan C. Balsells, both of Santa Ana, Calif.

[21] Appl. No.: 208,455

[22] Filed: Jun. 20, 1988

[51] Int. Cl.$^4$ .............................................. F16C 29/02
[52] U.S. Cl. ....................................... 384/26; 277/163; 384/29; 384/37
[58] Field of Search .................... 384/7, 10, 15, 16, 26, 384/29-32, 37, 42, 125, 215, 218, 219, 232-233, 276, 901; 277/165, 163, 157, 138

[56] References Cited

U.S. PATENT DOCUMENTS

| | | | |
|---|---|---|---|
| 1,828,289 | 10/1931 | Michell | 384/37 |
| 3,087,038 | 4/1963 | Bethke | 384/9 |
| 4,767,123 | 8/1988 | Kiese | 277/163 X |

FOREIGN PATENT DOCUMENTS

| | | | |
|---|---|---|---|
| 1007576 | 5/1957 | Fed. Rep. of Germany | 384/29 |
| 578710 | 10/1924 | France | 384/215 |

Primary Examiner—Thomas R. Hannon
Attorney, Agent, or Firm—Walter A. Hackler

[57] ABSTRACT

Guide ring apparatus includes a shaft configured for insertion into a bore and annular bearing means disposed on the shaft for engaging the interior surface of the bore along with an annular spring having a preselected force-deflection characteristics in operative relationship with the bearing for causing the annular bearing means as well as the shaft to float within the bore. This particular bearing and spring arrangement accommodates for variations in the bore and shaft due to manufacturing tolerances, wear and other eccentricities of the shaft and bore.

11 Claims, 2 Drawing Sheets

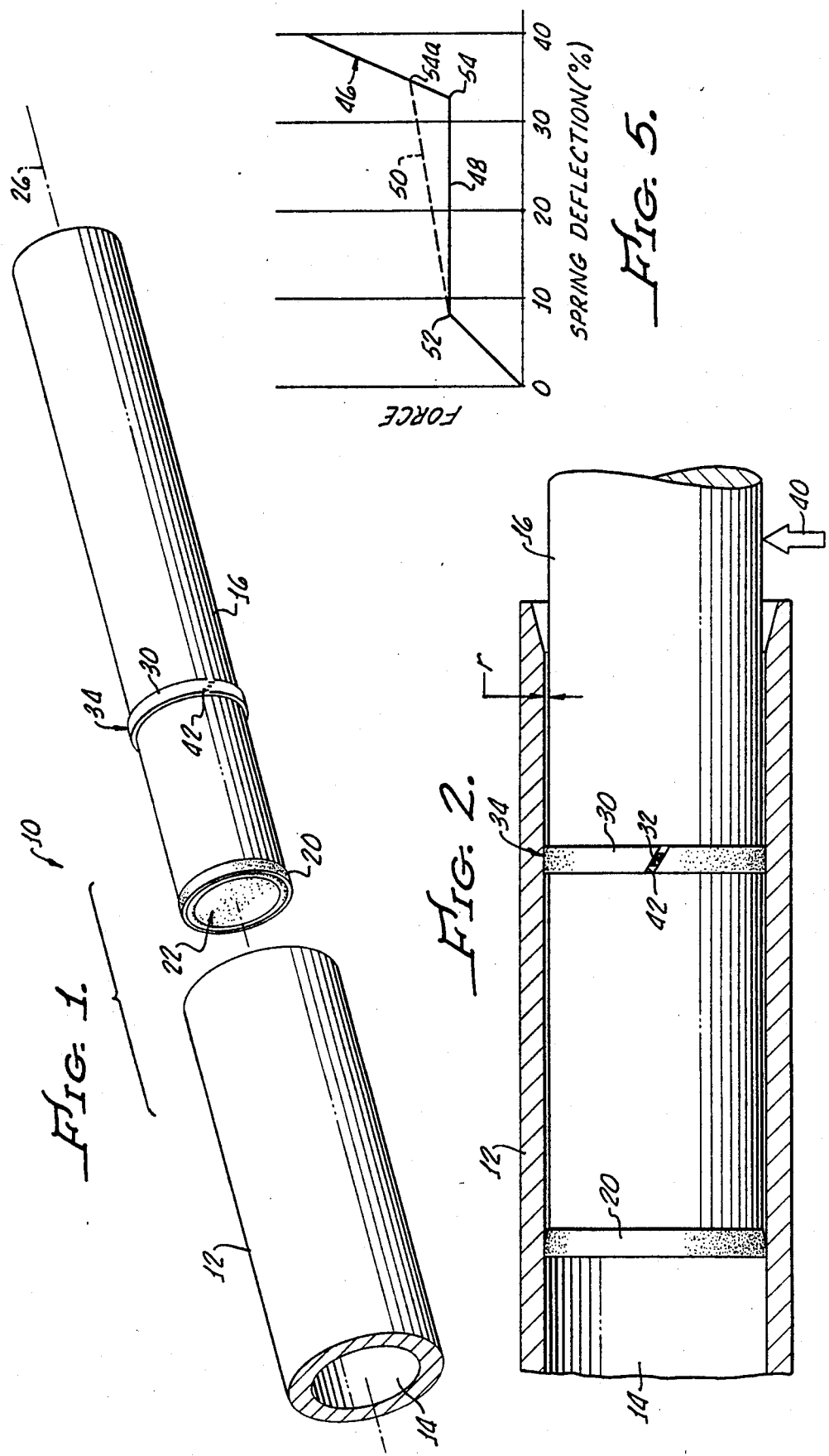

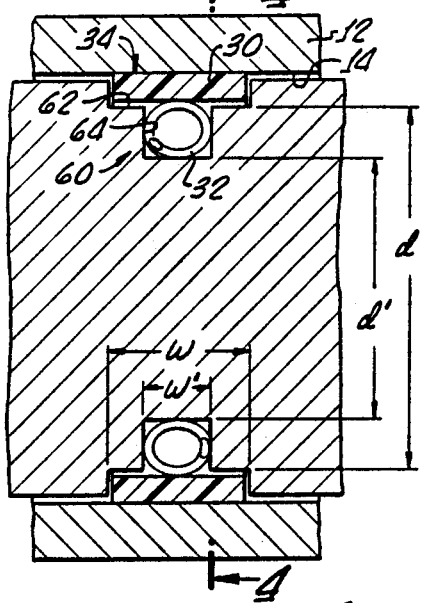
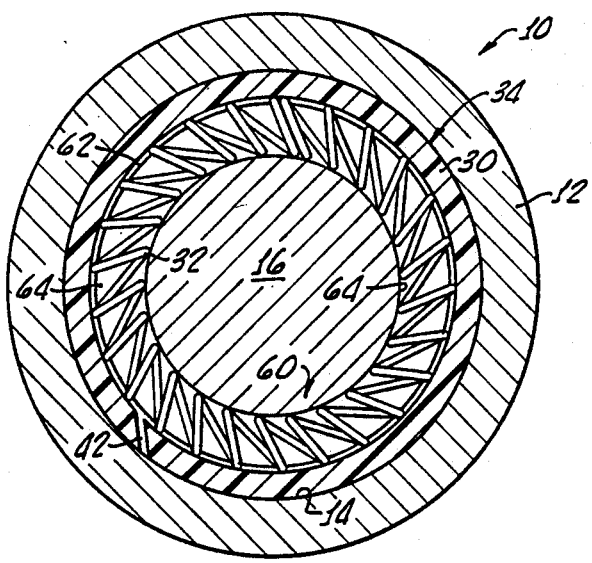
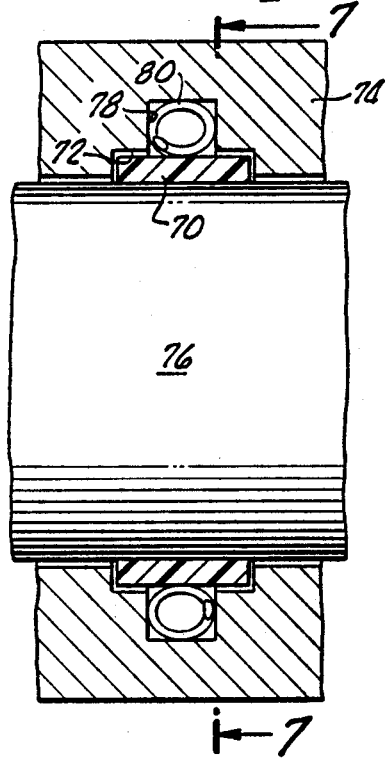
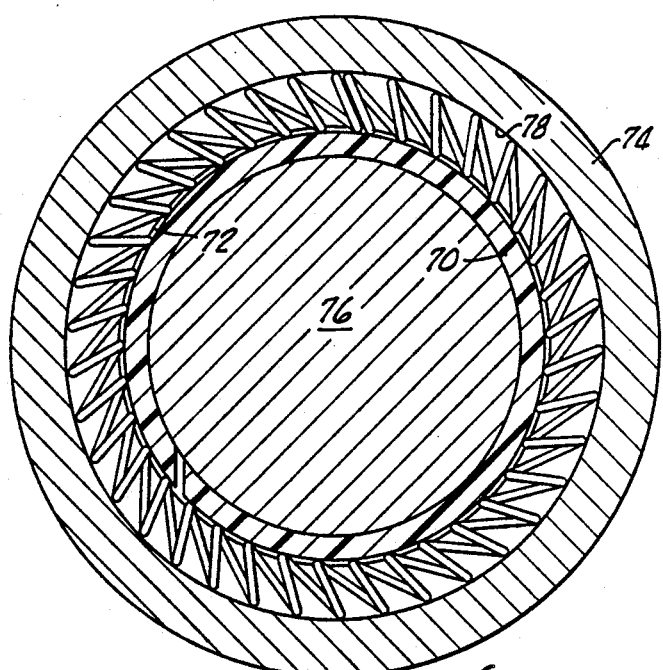
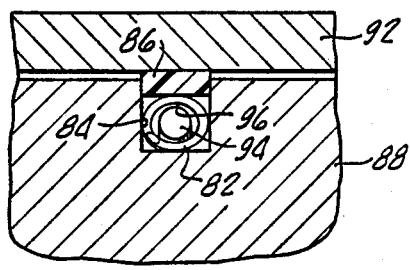

SPRING LOADED GUIDE RING

The present invention generally relates to guide rings and more specifically relates to guide ring or shaft guide apparatus for improved dynamic mating of a shaft and a bore hole.

Guide rings, also called wear rings, have been extensively used for many years in reciprocating and rotary applications, such as actuators and cylinders, for guiding shafts and pistons in order to reduce or prevent metal-to-metal contact between dynamic surfaces, thereby avoiding galling between the shaft and bore.

It is well known that pistons or shafts which are not properly guided cause uneven stress loading on seals and subsequent uneven wear of such seals. Sideloading of pistons, or shafts, improperly guided, causes contact between the shaft and bore. As a result, heavy wear occurs, which manifests itself in the seizing and/or galling of the shaft and bore.

Heretofore, guide rings have been formed from linear strips of material which are bent into a an annulus and fitted on the shaft. Typically, the annular strip does not completely encircle the shaft in order to allow a gap therein for the purpose of preventing pressure buildup and allowing fluids, or gas, to pass through the guide, or wear ring. In some instances, guide, or wear, rings have been molded into an annulus and inserted into a groove on the shaft to axially fix its position therealong.

In this configuration, a clearance exists between the outside diameter, the guide ring and the bore, or shaft, and the variation of such clearance determines the amount of play, or looseness, that may occur between the piston or shaft and the bore. As is well known, if the clearance is excessive, which inevitably occurs after long periods of use, heavy sideloading results on the seal which will induce considerable amount of wear, shorten the life, and decrease the reliability of the entire system.

The present invention provides guide rings or shaft guidance apparatus which enables the piston to be suspended within the bore. This suspension or floating action reduces sideloading and accommodates for other variations which may occur due to manufacturing tolerances, wear and other eccentricities of the shaft and bore.

SUMMARY OF THE INVENTION

Guide ring apparatus, in accordance with the present invention, generally includes a shaft configured for insertion into a bore, annular bearing means disposed on the shaft for engaging in interior surface of the bore and annular spring means disposed between the annular bearing means and the shaft for causing the annular bearing means to float between the shaft and the bore interior surface.

More particularly, guide ring apparatus, in accordance with the present invention, also may include means for defining a bore and wherein a bearing member and spring means disposed in an operative relationship therewith provide ring means for dynamically suspending the shaft and the bore. In this manner, the annular bearing member is spring loaded to enable the member to float radially and axially, with the spring supporting the weight of the shaft, thereby enabling the shaft to float, resulting in reduced sideloading of the shaft due to variations of tolerances, wear and eccentricities. In other words, the bearing member is spring-energized, which partially or fully supports the weight of the shaft, either in a static or dynamic application. In this arrangement, the spring loading allows for variations in eccentricities and other irregularities that may occur during the fabrication, use and wear, as hereinabove noted.

In addition, means for preventing spring overload by sideloading of the shaft may also be provided. In greater detail, the spring means may comprise an annular canted coil spring having generally flat radial force-deflection characteristics in the deflection range defined by the difference in the radius of the shaft and the bore. Because of the flat radial portions-deflection characteristics of the spring in the operating range, a constant uniform force is exerted on the bearing member and shaft despite irregularities caused by manufacture or wear.

The means for preventing spring overload may comprise means defining a first shaft radial groove in the shaft, configured for receiving the bearing member, and means defining a second shaft radial groove in the shaft, configured for receiving the spring means. The first shaft radial groove has a greater width than the second shaft radial groove and has a bottom diameter greater than the bottom diameter of the second shaft radial groove. In this manner, spring overload is prevented when the bearing member is compressed to the bottom diameter of the first shaft radial groove. This limits further compression of the spring means which is disposed thereunder in the second shaft radial groove.

Alternatively, the means for preventing spring overload may comprise means defining a first bore radial groove in an inside surface of the bore, configured for receiving the bearing member, and means defining a second bore radial groove, configured for receiving the spring means. In this configuration, the first bore radial groove has a greater width than the second bore radial groove and a bottom diameter less than the bottom diameter of the second bore radial groove. Again, when the loading causes the bearing member to engage the bottom of the second bore radial groove, further compression and overloading of the spring is prevented.

Alternatively, the means for preventing spring overload may comprise a circular wire ring disposed within the annulus defined by the windings of the annular canted coil spring. In this manner, overload is prevented by limiting the compression of the spring to the diameter of the circular wire therein.

BRIEF DESCRIPTION OF THE DRAWINGS

The advantages and features of the present invention will appear from the following description, considered in conjunction with the accompanying drawings, in which:

FIG. 1 is a perspective view of the present invention showing ring means for dynamically suspending a shaft in a spaced apart relationship with seal means disposed on the shaft;

FIG. 2 is a partial cross-sectional view of the present invention showing a shaft dynamically suspended within a bore by ring means of the present invention;

FIG. 3 is a cross-sectional view of one embodiment of the present invention showing a bearing member and spring being installed in shaft grooves;

FIG. 4 is an enlarged cross-sectional view taken along line 4—4 of FIG. 3, showing the disposition of the bearing member and spring between the bore and shaft;

FIG. 5 is a force-spring deflection curve of a spring suitable for use in the present invention.

FIG. 6 is a cross-sectional view of another embodiment of the present invention showing a bearing member and spring installed in bore grooves;

FIG. 7 is an enlarged cross-sectional view taken along line 7—7 of FIG. 6, showing relationship of the bearing member and spring within the bore and shaft; and FIG. 8 is an enlarged cross-sectional view showing alternate means for limiting compression of the spring of the present invention.

DETAILED DESCRIPTION

Turning now to FIG. 1, there is shown shaft guide apparatus 10, in accordance with the present invention, generally including a housing 12 or the like, which provides means for defining a bore 14 and a shaft 16 configured for insertion into the bore 14. An annular seal 20 may be disposed approximate one end 22 of the shaft 16 for enabling sealed, sliding axial movement of the shaft 16 within the bore 14. The seal may be of any suitable type well known in the art for preventing fluid from flowing therepast despite a pressure differential across the end 22 of the shaft 16. Reciprocal action of the shaft and seal 20 within the bore is necessary in many applications such as the measured titration of fluids and the pumping of fluids. Apparatus, not shown, for moving the shaft in the manner described often subjects the shaft to sideloading, that is, loading not parallel to a centerline 26 which can cause contact of the shaft 16 with the bore 14 which in turn may cause deformation of the surfaces, such as wear and galling.

A bearing member 30 and spring 32 (see FIG. 2), disposed in an operative relationship therewith, as will be hereinafter described in greater detail, provide ring means 34 for dynamically suspending the shaft 16 in the bore 14. When disposed in an operative relationship with the bearing member 30, the spring 32 provides means for providing a uniform radial bias on the shaft 16.

As more particularly shown in FIGS. 2, 3 and 4, the ring 34 is in a spaced-apart relationship with the seal 20 and supports the shaft 16 within the bore 14 to prevent contact therebetween due to sideloading as indicated by the arrow 40. (FIG. 2)

Since the ring 34 is not designed to function as a seal, a gap 42 and the bearing member 30 is provided to enable fluids to flow therepast.

An important feature of the present invention is the use of an annular canted coil spring 32 having a generally flat radial force-deflection characteristic in the deflection range, r (see FIG. 2) defined by the difference in the radius of the shaft 16 and the radius of the bore 14. Such springs are described in U.S. Pat. No. 4,655,462 issued on Apr. 7, 1987, which is hereby expressly incorporated in its entirety into the present application. Springs 32 suitable for the present invention generally have a load-deflection curve 46 shown in FIG. 5, which has a generally flat portion 48 or low-rising linear portion 50 between a minimum load point 52 and a maximum load point 54 or 54a.

Hence, in the operating range of the spring between 52 and 54 or 54a, the force exerted by the spring remains relatively constant despite the spring deflection. Thus, wearing of the bore or the bearing member 30 does not affect the force exerted on the bearing member 30 by the spring 32 in order to insure proper uniform force exerted around the periphery of the shaft 16 to enable its dynamic suspension, or floating within the bore. Thus, the canted coil spring 32 provides uniform loading around the shaft 16 periphery in order to take up for eccentricities and variations that may occur during operation of the guide apparatus.

That is, by using a guide ring 34, which is spring 32 loaded, the load is always against the dynamic portion of the bore or shaft and consequently, the guide ring 34 is always in intimate contact with the bore 14 and shaft surfaces. Because of the flexibility inherent with the spring deflection as shown in FIG. 5, it permits the guide ring 34 to float, thus reducing friction and wear in providing substantially better guidance to the seal which results in better performance. While the spring may be selected to provide just enough force to maintain the ring 34 in contact with the dynamic surfaces of the bore 14 or rod 16, it is preferable, that the spring 32 supports the weight of the shaft in order to provide true floating action of the ring 34 and shaft 26 within the bore, resulting in better guidance and overall performance.

It should be noted that floating action occurs whenever there is continual peripheral contact between the bearing member 30 and the bore 14 surface so that at all times supporting forces are radially directed on the shaft 16 along its entire periphery.

The specific spring load characteristics necessary to support the shaft as well as the size and width of the bearing member may be empirically determined without undue experimentation, with specific requirements being dictated, of course, by the size of the shaft 16, materials of construction and expected sideloading of the shaft during operation.

Guide ring apparatus 10 of FIG. 1 is shown in the cross-section in FIGS. 3 and 4. As previously discussed, the present invention accommodates for sideloading on the shaft 16. In the event of excessive shaft loading, which may cause the spring 32 to be deflected at points 54 or 54a, (see FIG. 5) means 60 may be prevented for preventing spring overloading by such sideloading of the shaft 16. Specifically, the means 60 may include a first shaft radial groove 62 which is configured for receiving the bearing member 30 and a second shaft radial groove 64, which is configured for receiving the spring 32. As shown in FIG. 3, the first shaft radial groove 62 has a greater width W than a width W' of the spring groove 64. The bottom diameter d of the bearing groove 62 is greater than the bottom diameter d' of the spring groove 64 in order to enable the bearing member 30 to rest against shoulder 66 to limit the deflection of the spring 32.

Alternatively, in a different embodiment of the present invention, shown in FIGS. 6 and 7, a bearing member 70 may be seated in a bearing groove 72 in a housing 74 in the position for bearing against a shaft 76, while a narrower spring groove 78 is configured in the housing 74 for supporting a spring 80. The spring and bearing members may be substantially identical to those hereinabove described except in this embodiment the bearing and spring grooves are disposed in the housing 74 and provide means for preventing permanent deformation of the spring 80.

Turning now to FIG. 8, there is shown yet another embodiment of the present invention in which a spring 82 is disposed in a groove 84 along with a bearing member 86, with the groove 84 being formed in a shaft 88 and biased into a housing 92. In this instance the single groove 84 supports both the spring 82 and bearing member and a circular wire ring 94 disposed within an annulus 96 protects the spring from over deflection and thereby provides means for preventing spring overload as hereinabove described.

Although there has been described hereinabove specific embodiments of guide ring apparatus, in accordance with the present invention, for the purpose of illustrating the manner in which the invention may be used to advantage, it should be appreciated that the invention is not limited thereto. Accordingly, any and all modifications, variations, or equivalent arrangements which may occur to those skilled in the art, should be considered to be within the scope of the invention as defined in the appended claims.

What is claimed is:

1. Guide ring apparatus comprising:
   means for defining a bore;
   a shaft configured for insertion into said bore;
   ring means for dynamically suspending said shaft in said bore, said ring means comprising a bearing member disposed between said shaft and bore and spring means disposed in an operative relationship with said bearing member for providing a uniform radial bias on the shaft, said spring means having a generally flat radial force-characteristic in a deflection range defined by the difference in radius of the shaft and the bore; and
   means for preventing spring overload by sideloading of said shaft.

2. The guide ring apparatus according to claim 1 wherein said means for preventing spring overload comprises means defining a first shaft radial groove in said shaft configured for receiving said bearing member and means defining a second shaft radial groove in said shaft configured for receiving said spring means, said first shaft radial groove having a greater width than said second shaft radial groove and having a bottom diameter greater than a bottom diameter of the second shaft radial groove.

3. The guide ring apparatus according to claim 1 wherein said means for preventing spring overload comprises means defining a first bore radial groove in an inside surface of said bore configured for receiving said bearing member and means defining a second bore radial groove configured for receiving said spring means, said first bore radial groove having a greater width than said second bore radial groove and having a bottom diameter less than a bottom diameter of the second bore radial groove.

4. The guide ring apparatus according to claim 1 wherein said means for preventing spring overload comprises a circular wire ring disposed within an annular defined by windings of the annular canted coil spring.

5. Shaft guide apparatus comprises:
   means for defining a bore;
   a shaft configured for insertion into said bore;
   seal means, disposed proximate one end of said shaft, for enabling sealed, sliding axial movement of the shaft within the bore; and
   ring means, disposed along the shaft in a spaced apart relationship with said seal means, for centering said shaft within the bore, said ring means comprising an annular bearing member with spring means in an operative relationship therewith for providing a uniform radial bias on the shaft.

6. The shaft guide apparatus according to claim 5 further comprising means for preventing permanent spring deformation.

7. The shaft guide apparatus according to claim 6 wherein the spring means comprises an annular canted coil spring having a generally flat radial force-deflection characteristics in the deflection range defined by the difference in radius of the shaft and the bore.

8. The shaft guide apparatus according to claim 7 wherein said means for preventing spring overload comprises means defining a first shaft radial groove in said shaft configured for receiving said bearing member and means defining a second shaft radial groove in said shaft configured for accepting said spring means, said first shaft radial groove having a greater width than said second shaft radial groove and having a bottom diameter greater than a bottom diameter of the second shaft radial groove.

9. The shaft guide apparatus according to claim 7 wherein said means for preventing spring overload comprises means defining a first bore radial groove in an inside surface of said bore configure for receiving said bearing member and means defining a second bore radial groove, configured for receiving said spring means, said first bore radial groove having a greater width than said second bore radial groove and having a bottom diameter less than a bottom diameter of the second bore radial groove.

10. The shaft guide apparatus according to claim 7 wherein said means for preventing spring overload comprises a circular wire ring disposed within an annular defined by windings of the annular canted coil spring.

11. Guide ring apparatus comprising:
    a shaft configured for insertion into a bore;
    annular bearing means disposed on said shaft for engaging an interior surface of said bore;
    annular spring means disposed between said annular bearing means and said shaft for causing the annular bearing means to float between the shaft and the bore interim surface;
    said spring means comprising an annular canted coil spring having a generally flat radial force-deflection characteristic in the deflection range defined by a difference in radius of the shaft and the bore; and
    means for preventing permanent spring deformation due to sideloading of said shaft within the bore;
    said means for preventing spring overload comprising means defining a first shaft radial groove in said shaft configured for receiving said bearing member and means defining a second shaft radial groove in said shaft, configured for receiving said spring means, said first shaft radial groove having a greater width than said second shaft radial groove and having a bottom diameter greater than a bottom diameter of the second shaft radial groove.

* * * * *